United States Patent
Uramoto

(10) Patent No.: US 8,459,564 B2
(45) Date of Patent: *Jun. 11, 2013

(54) APPARATUSES FOR EXECUTING WIRELESS TRANSMISSION USING A MAGNETIC FIELD, WIRELESS TRANSMISSION APPARATUSES, AND WIRELESS RECEIVER APPARATUSES

(75) Inventor: Yoichi Uramoto, Kanagawa (JP)

(73) Assignee: Felica Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,567

(22) Filed: Jul. 27, 2012

(65) Prior Publication Data

US 2012/0286045 A1 Nov. 15, 2012

Related U.S. Application Data

(63) Continuation of application No. 13/038,934, filed on Mar. 2, 2011, now Pat. No. 8,245,943, which is a continuation of application No. 11/808,466, filed on Jun. 11, 2007, now Pat. No. 7,922,092.

(30) Foreign Application Priority Data

Jun. 13, 2006 (JP) ................ P2006-163766

(51) Int. Cl.
*G06K 19/06* (2006.01)

(52) U.S. Cl.
USPC .......................... 235/492; 235/486

(58) Field of Classification Search
USPC ................. 235/492, 486, 487, 493, 449
See application file for complete search history.

(56) References Cited

U.S. PATENT DOCUMENTS

| 5,689,207 | A | * | 11/1997 | Nakatsuka et al. | ........... | 327/355 |
| 5,751,765 | A | | 5/1998 | Matsubara | | |
| 6,624,743 | B1 | | 9/2003 | Ikefuji et al. | | |
| 6,952,167 | B2 | | 10/2005 | Wakabayashi | | |
| 7,064,562 | B2 | * | 6/2006 | Lin et al. | ........... | 324/698 |
| 7,922,092 | B2 | * | 4/2011 | Uramoto | ........... | 235/492 |
| 2009/0167436 | A1 | | 7/2009 | Ardehali | | |
| 2009/0276639 | A1 | | 11/2009 | Saha et al. | | |

FOREIGN PATENT DOCUMENTS

| JP | 10-145987 A | 5/1998 |
| JP | 2000-099653 A | 4/2000 |
| JP | 2000-123121 A | 4/2000 |
| JP | 2001-177449 A | 6/2001 |

(Continued)

OTHER PUBLICATIONS

U.S. Appl. No. 11/808,466 by Uramoto, filed Jun. 11, 2007: Non-Final Office Action, dated Jun. 17, 2010.

(Continued)

*Primary Examiner* — Thien M Le
(74) *Attorney, Agent, or Firm* — Finnegan, Henderson, Farabow, Garrett & Dunner, L.L.P.

(57) ABSTRACT

An integrated circuit, a non-contact IC card, a reader/writer, a wireless communications method, and a computer program are provided to improve communication. The integrated circuit configured to execute wireless communication by means of magnetic field. The integrated circuit has a resonance circuit having resonance frequencies of a plurality of levels, a confirmation block configured to confirm whether a predetermined condition is satisfied, and a switching block configured to change the resonance frequencies if the predetermined condition is found satisfied as a result of the confirmation.

21 Claims, 11 Drawing Sheets

FOREIGN PATENT DOCUMENTS

| | | | |
|---|---|---|---|
| JP | 2001-222696 | A | 8/2001 |
| JP | 2002-109495 | A | 4/2002 |
| JP | 2003-036418 | A | 2/2003 |
| JP | 2005-073113 | A | 3/2005 |
| JP | 2005-303697 | A | 10/2005 |
| JP | 2006-238398 | A | 9/2006 |
| JP | 2006-279813 | A | 10/2006 |

OTHER PUBLICATIONS

U.S. Appl. No. 11/808,466 by Uramoto, filed Jun. 11, 2007: Notice of Allowance, dated Dec. 2, 2010.

U.S. Appl. No. 13/038,934 by Uramoto, filed Mar. 2, 2011: Non-Final Office Action, dated Dec. 22, 2011.

U.S. Appl. No. 13/038,934 by Uramoto, filed Mar. 2, 2011: Notice of Allowance, dated Apr. 20, 2012.

* cited by examiner

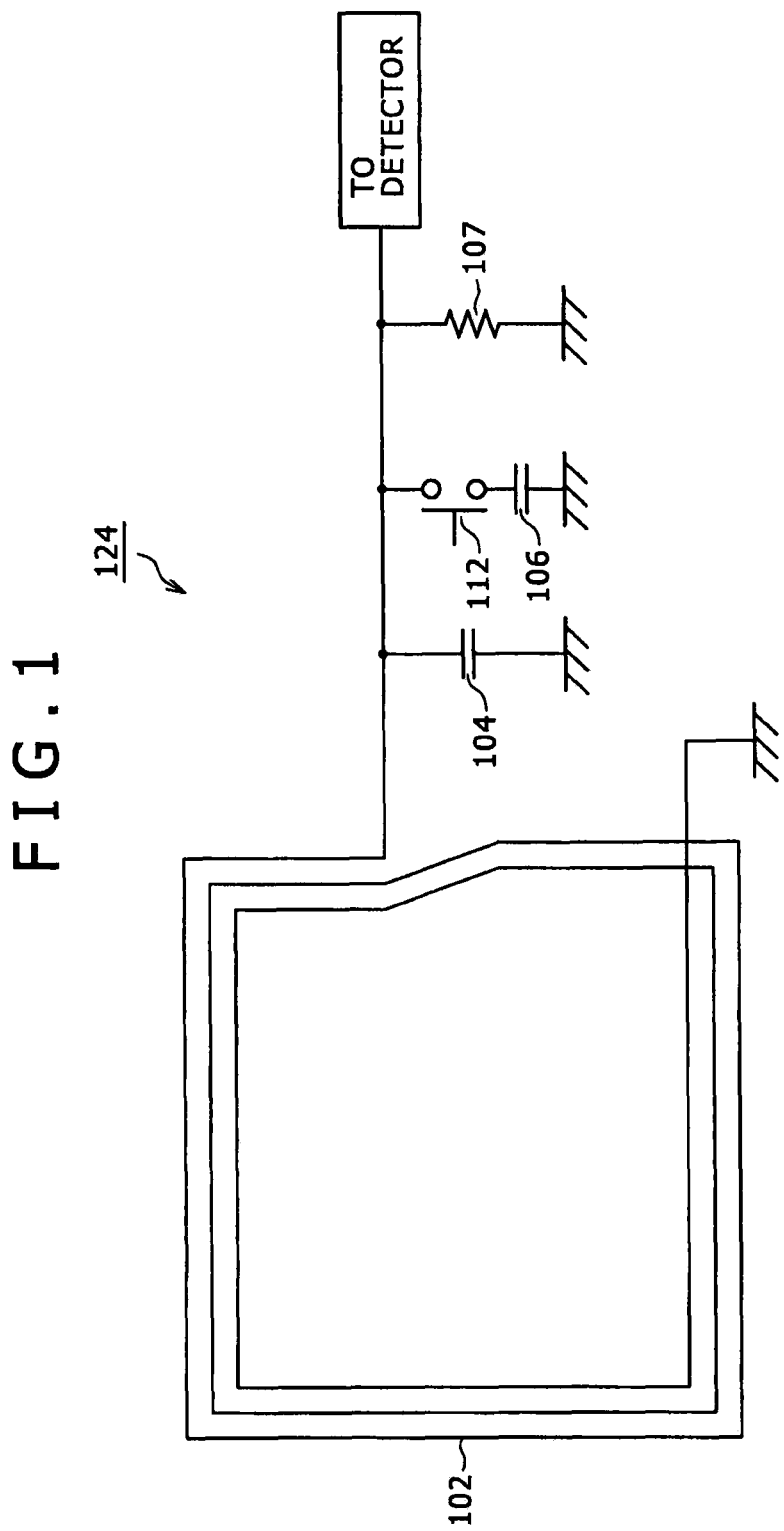

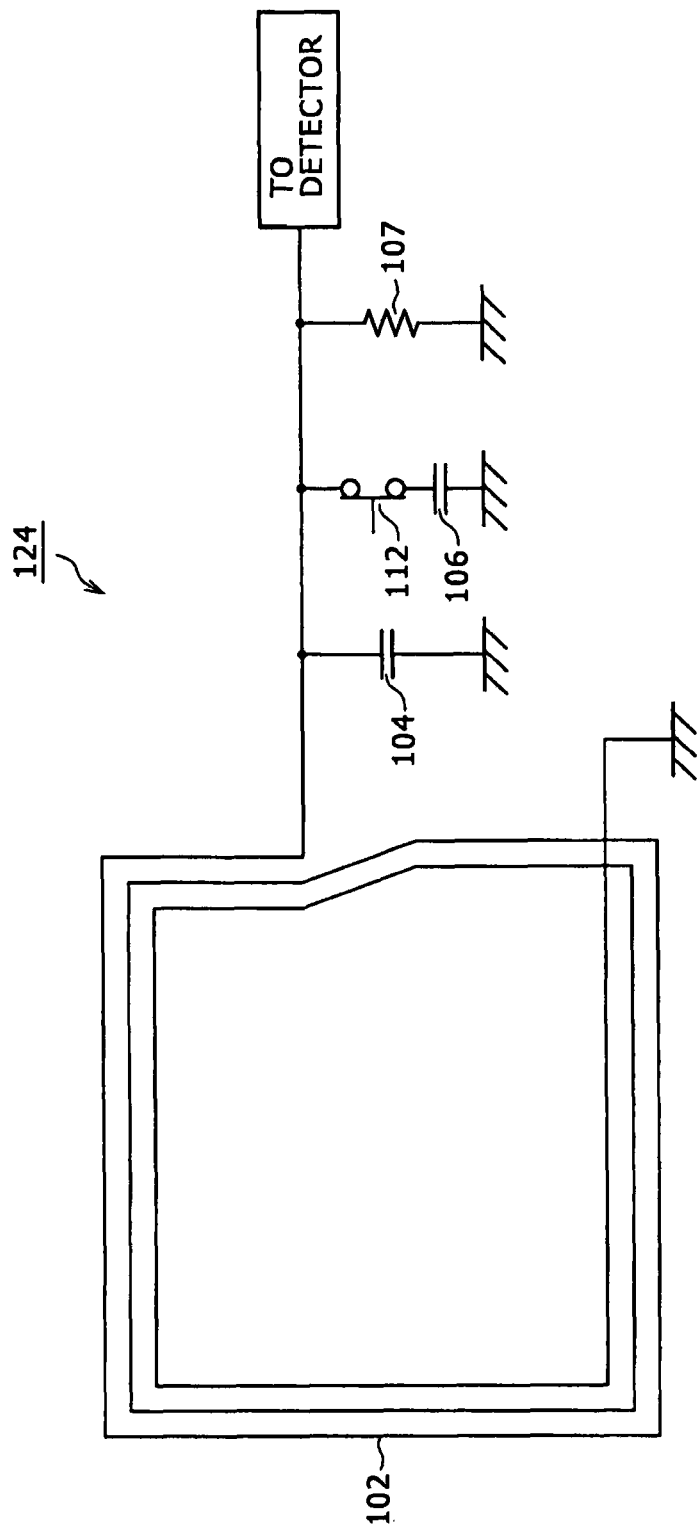

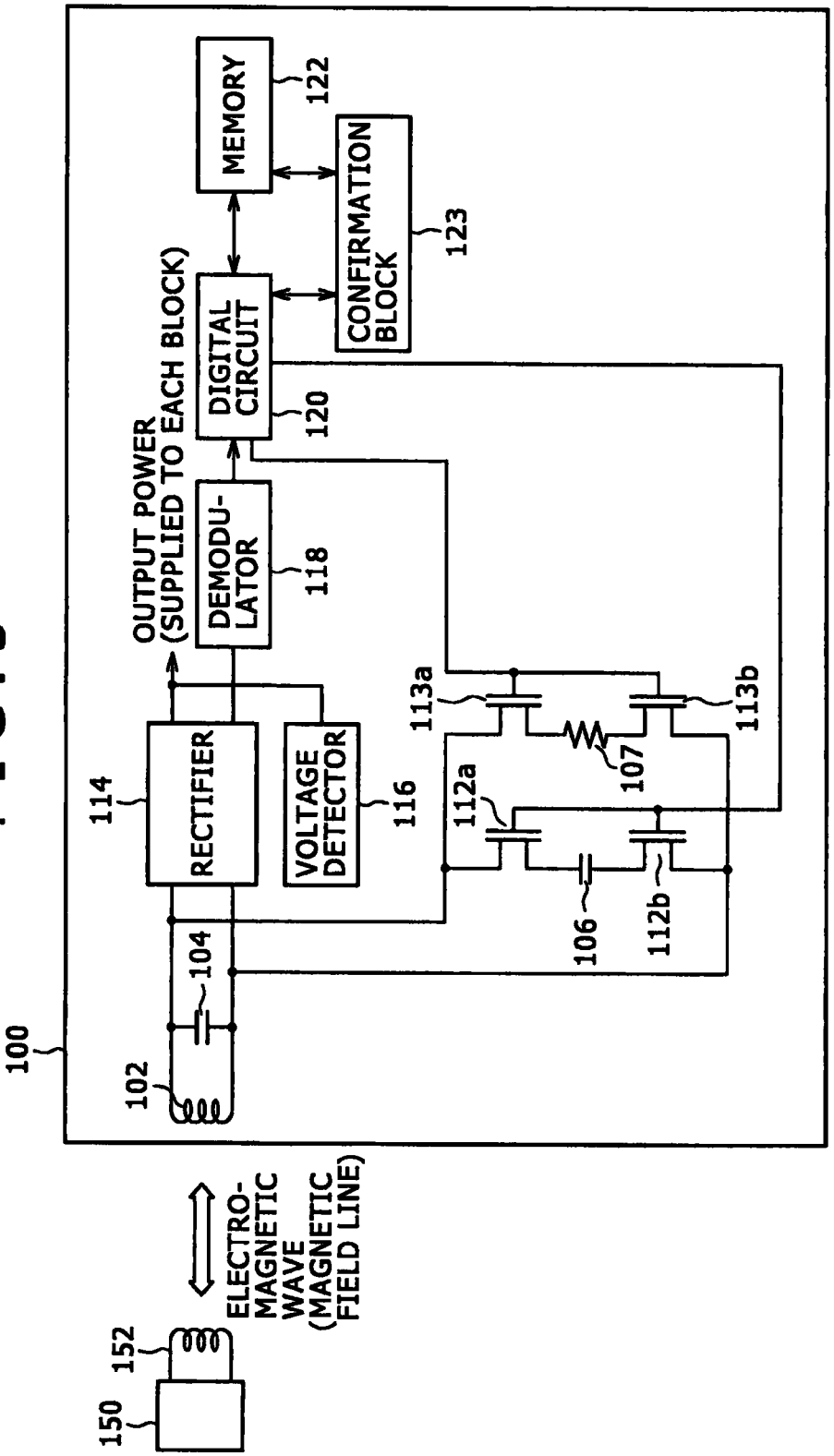

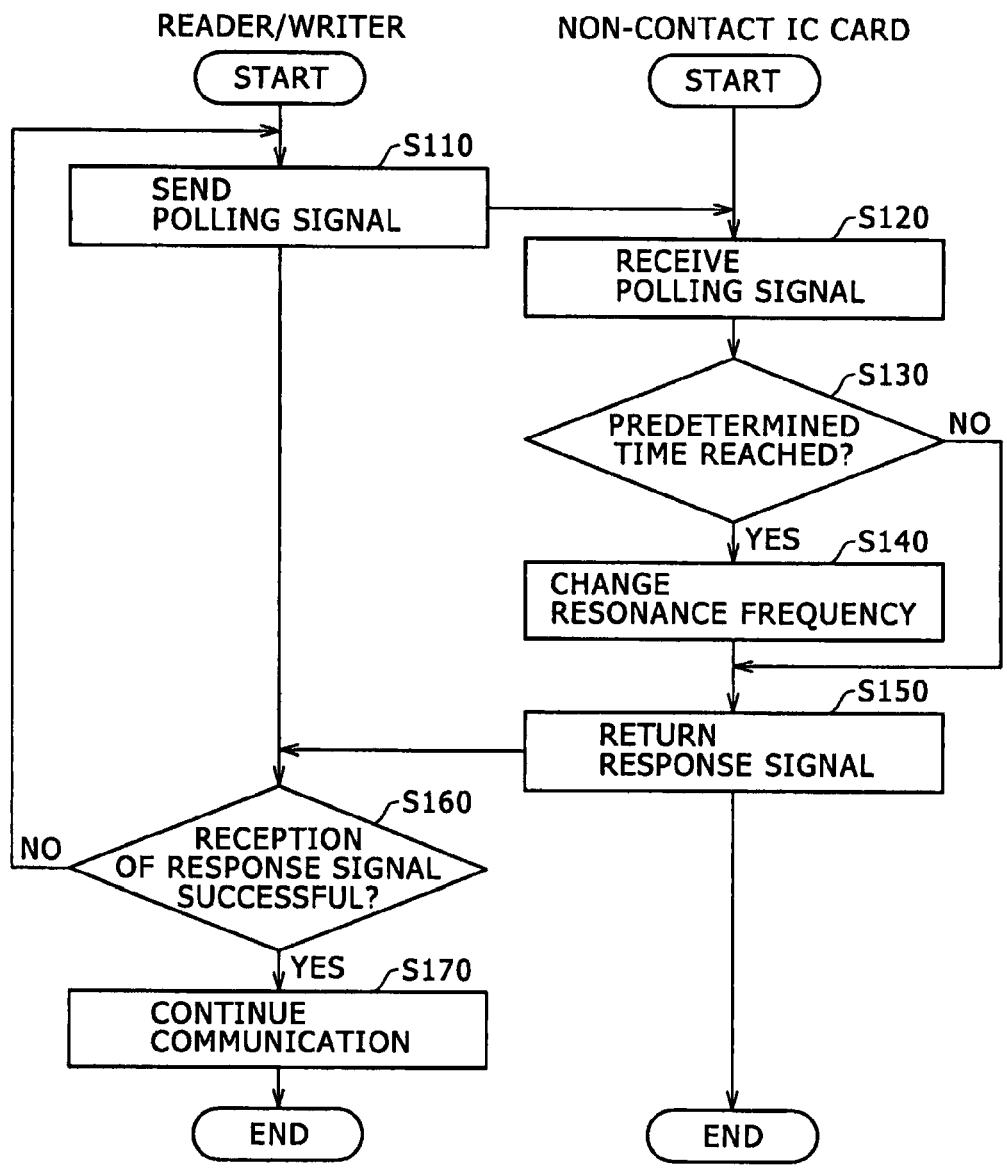

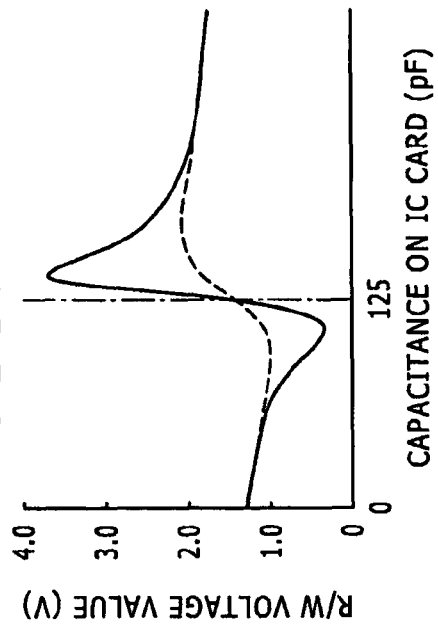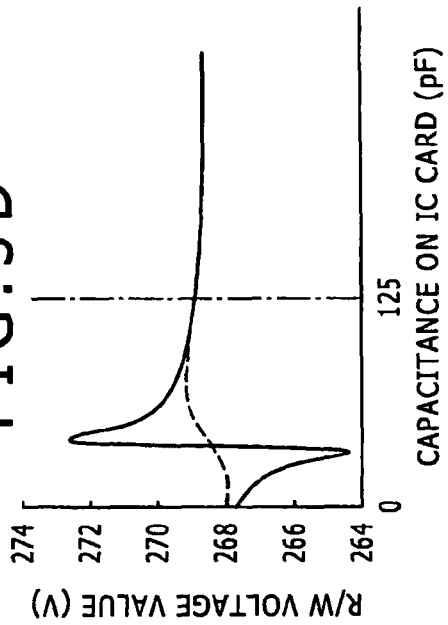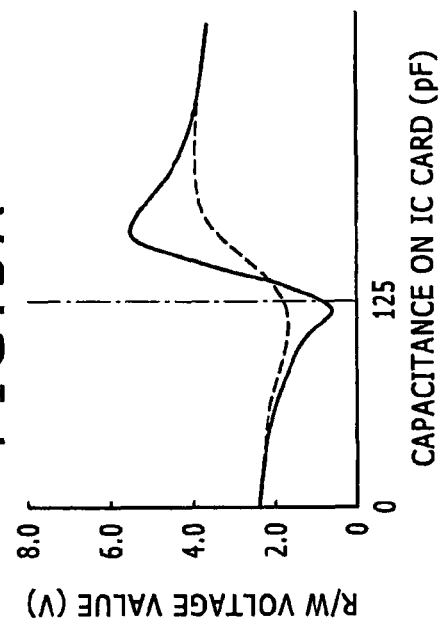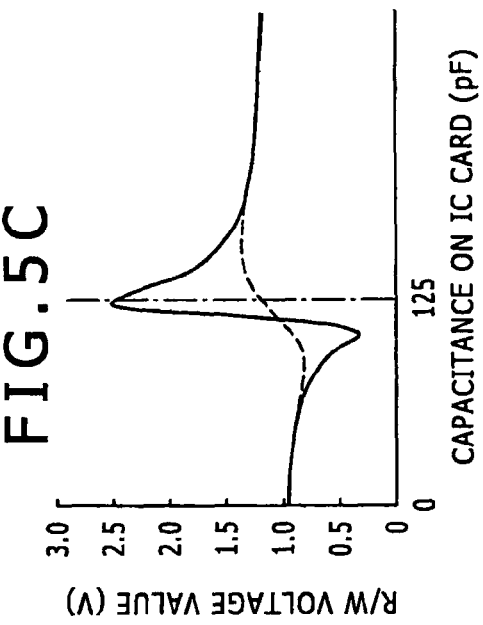

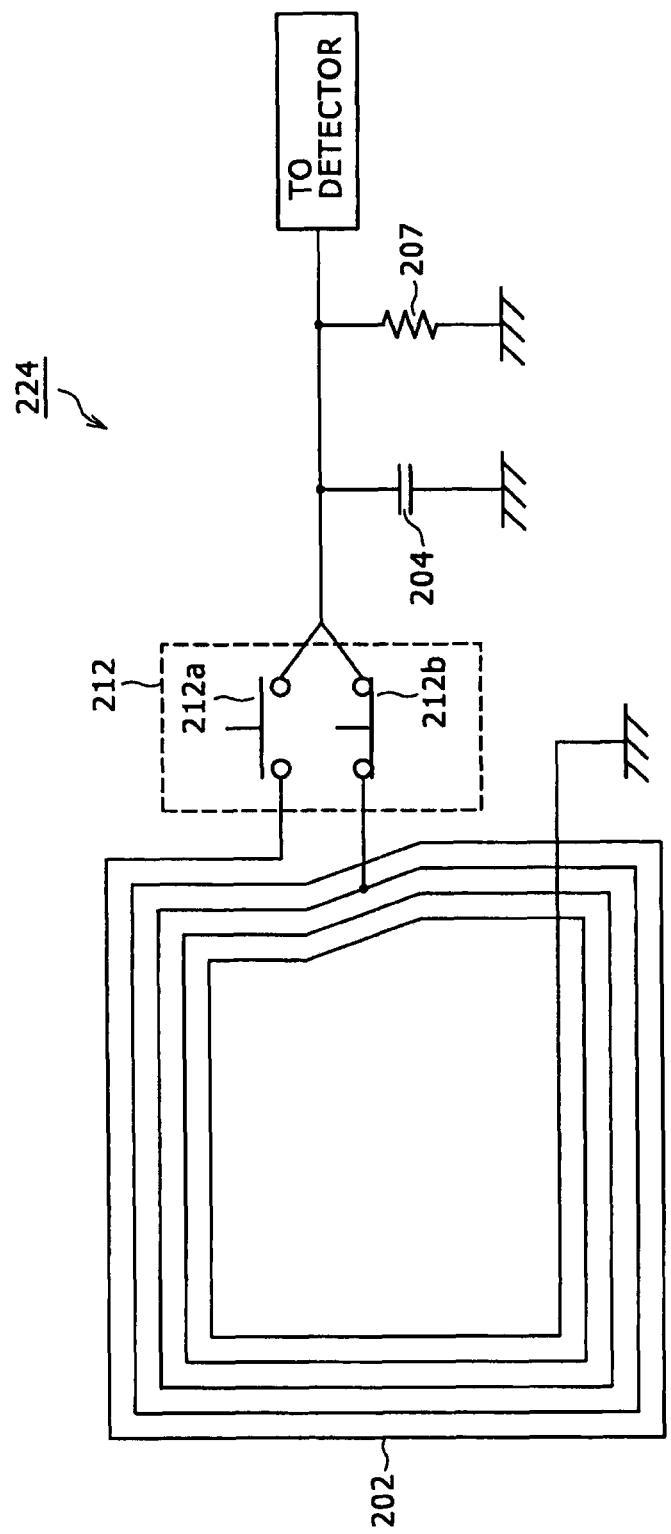

APPARATUSES FOR EXECUTING WIRELESS TRANSMISSION USING A MAGNETIC FIELD, WIRELESS TRANSMISSION APPARATUSES, AND WIRELESS RECEIVER APPARATUSES

CROSS REFERENCES TO RELATED APPLICATIONS

This application is a continuation of application Ser. No. 13/038,934 filed Mar. 2, 2011 now U.S. Pat. No. 8,245,943, which is a continuation of application Ser. No. 11/808,466, filed on Jun. 11, 2007 now U.S. Pat. No. 7,922,092, which claims the benefit of priority to Japanese Patent Application No. 2006-163766, filed on Jun. 13, 2006, the entire disclosures of which are incorporated herein by reference.

BACKGROUND OF THE INVENTION

1. Field of the Invention

The present invention relates to an integrated circuit, non-contact IC card, a reader/writer, a wireless communications method, and a computer program.

2. Description of the Related Art

Non-contact IC (Integrated Circuit) cards are widely in use in which an IC chip is embedded in a card to execute wireless communication with a reader/writer (R/W) terminal in a non-contact manner. Especially, non-contact IC cards are widely in use in ticket check processing at ticket gates of public transportation, payment processing at checkout counters of retail stores, and clock-in/clock-out management at offices, for example.

A non-contact IC card contains no power supply. Therefore, the non-contact IC card uses, as its power supply, a voltage that is generated when the IC card is held over a reader/writer terminal through an antenna coil that receives a magnetic field generated by the reader/writer terminal. The voltage generated as an induced voltage is supplied to each component of the IC card as the power. The non-contact IC card and the reader/writer terminal are communicating each other by use of the radio wave of a predetermined frequency. The non-contact IC card and the reader/writer terminal each have a frequency resonance circuit that resonates at that predetermined frequency. For example, in the ISO14443 standard that is the communications standard of the non-contact IC card, the resonance frequency is set to 13.56 MHz.

The response from the non-contact IC card or the IC chip embedded in a portable information processing terminal is supported by "load modulation". In load modulation, the load inside the IC chip is turned on/off to change the impedance of the IC chip relative to the reader/writer terminal. The reader/writer terminal detects the change in the power consumption of the IC chip as a voltage change of the carrier (the card or the portable terminal). Therefore, the reader/writer terminal can recognize a response from the IC chip by the occurrence of a voltage change.

Recently, a method is known in which an IC chip is incorporated in not only a non-contact IC card but also a portable information processing terminal, such as a mobile phone, and this terminal is held over a reader/writer terminal, thereby executing wireless communication with the reader/writer terminal. Holding such a portable terminal over a reader/writer terminal connected to a ticket check system of public transportation or a register machine at a retail store allows the execution of ticket check processing or payment processing by use of a portable information processing terminal. Especially, at ticket gates or checkout counters, it is required to execute communication at high speeds so as not to put the users of portable information processing terminals into a waiting line. For this purpose, a technology for stabilizing the response from the IC chip is disclosed.

The above-mentioned technology is disclosed in Japanese Patent Laid-open No. 2001-222696 (Patent document 1). Patent document 1 discloses a method in which the capacities of capacitors in a resonance circuit in a non-contact IC card is changed to shift the resonance frequency of the resonance circuit, thereby improving the response from the IC card.

SUMMARY OF THE INVENTION

However, it sometimes occurs that the communication between the reader/writer connected to a ticket checking system or a checkout counter system and the IC chip embedded in an IC card or a portable information processing terminal cannot be successfully executed. This unsuccessful communication is mainly caused by ASK (Amplitude Shift Keying), which is a communication scheme used between the reader/writer terminal and the IC chip. To be more specific, the above-mentioned load modulation is used for the response from the IC chip embedded in a non-contact IC card or a portable information processing terminal to the reader/writer terminal and the reader/writer terminal detects the change in power consumption of the IC chip as a voltage change of the carrier (the card or the portable terminal).

In load modulation, the resistor is turned on/off in the IC chip to generate a diamagnetic field toward the reader/writer terminal that generates radio waves, thereby making a response to the reader/writer terminal. When the impedance of the IC chip relative to the reader/writer terminal changes, the reader/writer terminal can recognize a response from the IC chip. However, depending on the distance between the reader/writer terminal and the IC chip and the diamagnetic field generated by the turning on/off of the resistor, too, the absolute value of the impedance including the IC card or the information processing terminal as seen from the antenna of the reader/writer terminal may not change by varying the load of the IC chip. Hence, in that distance, a response from the IC chip may not be recognized by the reader/writer terminal as a response.

Referring to FIG. 9, there is shown a circuit diagram for describing related-art reader-writer terminal and IC card. A reader/writer 10 is made up of a power supply 11, resistors 12 and 13, a capacitor 14, and an antenna coil 15. An IC card 20 is made up of a switch 21, a resistor 23, a capacitor 24, and an antenna coil 25. The antenna coil 15 of the reader/writer 10 and the antenna coil 25 of the IC card 20 wirelessly communicate each other by use of magnetic field M in a noncontact manner. Communication by the IC card 20 is executed by changing the magnetic field from the IC card 20 by turning on/off the switch 21.

FIG. 10 is a graph indicative of a problem that the reader/writer also cannot recognize a response depending on the diamagnetic field caused by turning on/off the resistor. In the figure, the horizontal axis is indicative of the distance between the reader/writer and the IC card having an IC chip and the vertical axis is indicative of voltage $V_{R/W}$ across the antenna of the reader/writer. The relationship between distance and voltage with the switch 21 of the IC card 20 being off is indicated by a solid line, while the relationship between distance and voltage with the switch 21 of the IC card 20 being on. When the switch 21 is turned on, the resistor 23 goes valid, upon which a current flows into the IC card 20. When the current flows into the IC card 20, this current causes the antenna coil 25 to generate a magnetic field (or a diamagnetic field). When this magnetic field is received by the antenna coil 15 of the reader/writer 10, a current due to this magnetic field is generated on the antenna coil 15, the generated current changing voltage $V_{R/W}$ across the antenna of the reader/writer 10. This change of voltage $V_{R/W}$ tells the reader/writer 10 whether there has been a response from the IC card 20.

However, depending on the distance between the reader/writer 10 and the IC card 20, there is a position at which turning on the switch 21 on the IC chip side to validate the resistor 23 does not change voltage $V_{R/W}$ across the antenna of the reader/writer 10. In FIG. 10, at a point where the solid line and the dashed line cross each other, turning on/off the switch 21 does not change voltage $V_{R/W}$ across the antenna of the reader/writer 10. Hence a problem that, depending on the distance between the reader/writer 10 and the IC card 20, turning on the switch 21 by the IC card 20 to validate the resistor 23 may not cause the reader/writer 10 to recognize a response from the IC card 20.

Thus, there is a point at which communication is disabled depending on the distance from the reader/writer in a response made by turning on/off the resistor as described above, thereby presenting a problem that a response from the IC chip cannot recognized by the reader/writer. Especially, at ticket gates of public transportation and checkout counters of retail stores, it is required to execute the communication as quickly as possible to prevent the users of IC cards from putting in a waiting line. Otherwise, it takes long enough for delaying the processing of the passing of the users through these checkpoints, thereby causing inconvenience to the users.

Therefore, the present invention addresses the above-identified and other problems associated with related-art methods and apparatuses and solves the addressed problems by providing an integrated circuit, a non-contact IC card, a reader/writer, a wireless communications method, and a computer program that are novel and improved.

In carrying out the invention and according to one embodiment thereof, there is provided an integrated circuit configured to execute wireless communication by use of a magnetic field. This integrated circuit has a resonance circuit having resonance frequencies of a plurality of levels; a confirmation block configured to confirm whether a predetermined condition is satisfied; and a switching block configured to change the resonance frequencies if the predetermined condition is found satisfied as a result of the confirmation.

According to the above-mentioned novel configuration, the resonance circuit provides resonance frequencies of a plurality of levels, and confirmation block confirms whether a predetermined condition is satisfied, and the switching block switches between the resonance frequencies of the resonance circuit if the predetermined condition is found satisfied. Consequently, the above-mentioned integrated circuit practiced as one embodiment of the invention can change the resonance frequencies of the resonance circuit to make a response to radio waves transmitted from the outside.

The above-mentioned predetermined condition may be a predetermined count executed in the confirmation block or a predetermined period of time measured in the confirmation block. According to this novel configuration, the confirmation block counts a predetermined number of times and/or a predetermined period of time. As a result, if the predetermined number of times and/or the predetermined period of time is found exceeded or passed, the resonance frequencies of the resonance circuit are switched to make a response to radio waves transmitted from the outside.

The above-mentioned integrated circuit further has a capacitor having capacitances of a plurality of levels and the switching block switches between the capacitances to change the resonance frequencies. According to this novel configuration, the capacitor has capacitances of a plurality of levels, which are switched to change the resonance frequencies of the resonance circuit. As a result, switching between the capacitances of the capacitor can change the resonance frequencies of the resonance circuit to make a response to radio waves transmitted from the outside.

The above-mentioned integrated circuit further has an inductor having inductances of a plurality of levels and the switching block switches between the inductances to change the resonance frequencies. According to this novel configuration, the inductor has inductances of a plurality of levels, which are switched to change the resonance frequencies of the resonance circuit. As a result, switching between the inductances changes the resonance frequencies of the resonance circuit to make a response to radio waves transmitted from the outside.

In carrying out the invention and according to another embodiment thereof, there is provided a non-contact IC card having the above-mentioned integrated circuit.

According to this novel configuration, a resonance circuit has resonance frequencies of a plurality of levels; a confirmation block confirms whether a predetermined condition is satisfied; and a switching block changes the resonance frequencies if the predetermined condition is found satisfied as a result of the confirmation. As a result, this non-contact IC card can change the resonance frequencies of the resonance circuit to make a response to radio waves transmitted from the outside.

In carrying out the invention and according to still another embodiment thereof, there is provided an information processing terminal having an integrated circuit.

According to this novel configuration, a resonance circuit has resonance frequencies of a plurality of levels; a confirmation block confirms whether a predetermined condition is satisfied; and a switching block changes the resonance frequencies if the predetermined condition is found satisfied as a result of the confirmation. As a result, this information processing terminal can change the resonance frequencies of the resonance circuit to make a response to radio waves transmitted from the outside.

In carrying out the invention and according to yet another embodiment thereof, there is provided a card reader/writer having an integrated circuit.

According to this novel configuration, a resonance circuit has resonance frequencies of a plurality of levels; a confirmation block confirms whether a predetermined condition is satisfied; and a switching block changes the resonance frequencies if the predetermined condition is found satisfied as a result of the confirmation. As a result, this card reader/writer can change the resonance frequencies of the resonance circuit to make a response to radio waves transmitted from the outside.

In carrying out the invention and according to a different embodiment thereof, there is provided a wireless communications method based on an integrated circuit having a resonance circuit having resonance frequencies of a plurality of levels. This method has the steps of: confirming whether a predetermined conditions is satisfied; and changing the resonance frequencies by switching between the resonance frequencies if the predetermined condition is found satisfied.

According to this method, whether a predetermined condition is satisfied or not is determined in the confirmation step and, if the predetermined conditions is found satisfied, then the resonance frequencies of the resonance circuit are changed. As a result, this wireless communications method can change the resonance frequencies of the resonance circuit to make a response to radio waves transmitted from the outside.

In carrying out the invention and according to a still different embodiment thereof, there is provided a computer program configured to control an integrated circuit having resonance frequencies of a plurality of levels. This computer program has the processes of confirming whether a predetermined conditions is satisfied; and changing the resonance frequencies by switching between the resonance frequencies if the predetermined condition is found satisfied.

According to this computer program, whether a predetermined condition is satisfied or not is determined in the confirmation step and, if the predetermined conditions is found satisfied, then the resonance frequencies of the resonance circuit are changed at the resonance frequencies changing process. As a result, this computer program can change the resonance frequencies of the resonance circuit to make a response to radio waves transmitted from the outside.

As described and according to the invention, an integrated circuit, a non-contact IC card, a reader/writer, a wireless communications method, and a computer program can be provided.

BRIEF DESCRIPTION OF THE DRAWINGS

FIG. 1 is a circuit diagram illustrating an integrated circuit practiced as a first embodiment of the invention;

FIG. 2 is a circuit diagram illustrating the integrated circuit practiced as the first embodiment of the invention;

FIG. 3 is a block diagram illustrating an exemplary configuration of a non-contact IC card based on the above-mentioned integrated circuit practiced as the first embodiment of the invention;

FIG. 4A is a flowchart indicative of a wireless communications method practiced as the first embodiment of the invention;

FIGS. 5A, 5B, 5C, and 5D are diagrams illustrating relationships between the capacitance of a non-contact IC card and the voltage of a reader/writer (R/W);

FIG. 6 is a circuit diagram illustrating an integrated circuit practiced as a second embodiment of the invention;

DETAILED DESCRIPTION OF THE PREFERRED EMBODIMENTS

Figure 4B:
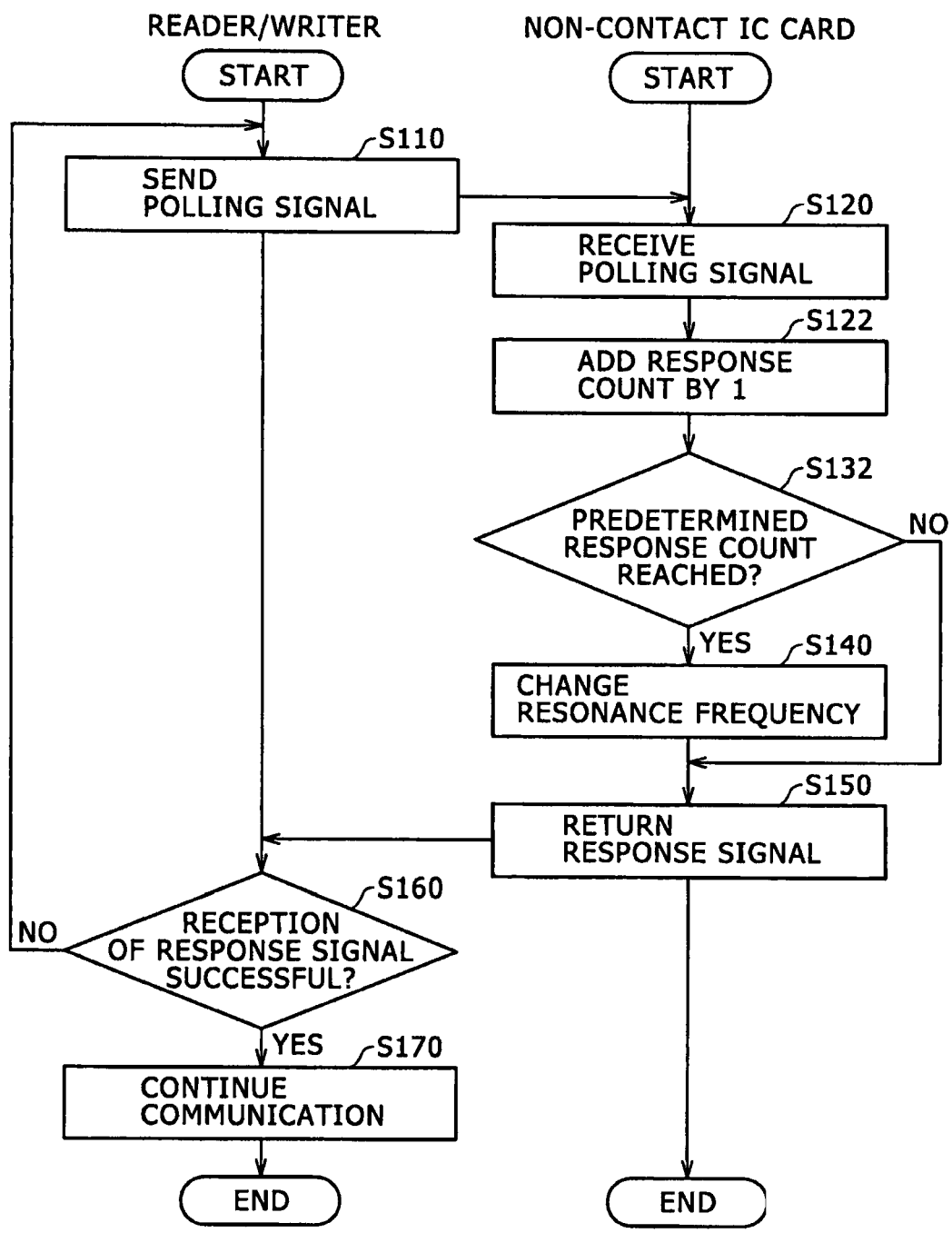
FIG. 4B is another flowchart indicative of the wireless communications method practiced as the first embodiment of the invention.

This invention will be described in further detail by way of embodiments thereof with reference to the accompanying drawings. It should be noted that, throughout the description herein and the drawings accompanying hereto, components having substantially the same functional configuration are denoted by the same reference numeral, thereby skipping the duplicate description.

(A first Embodiment)

Now, referring to FIGS. 1 and 2, there are shown integrated circuits practiced as a first embodiment of the invention. The following describes exemplary configurations of these integrated circuits.

As shown in FIG. 1, an integrated circuit 124 practiced as the first embodiment of the invention is made up of an antenna coil 102, a first capacitor 104, a second capacitor 106, a resistor 107, and a switching block 112.

Receiving a radio wave containing a predetermined frequency component from a radio wave generating device, such as a reader/writer terminal, the antenna coil 102 generates an alternate voltage across the antenna coil 102 by electromagnetic induction. In the present embodiment, the number of windings of the 102 is three; however, the number of windings is not limited to three in the present embodiment.

Connecting the antenna coil 102 with the first capacitor 104 in parallel as shown in FIG. 1 configures a resonance circuit. When a change occurs on the magnetic field passing the antenna coil 102, an alternate voltage is generated on the antenna coil 102, upon which a current flows into the integrated circuit 124 through the resistor 107, an electric power being consumed by the resistor 107.

The switching block 112 is used to connect or disconnect the second capacitor 106 to or from the integrated circuit 124 by on/off operations. Connecting or disconnecting the second capacitor 106 to or from the integrated circuit 124 causes the resonance frequency of the resonance circuit made up of the antenna coil 102 and the first capacitor 104 to change.

The switching block 112 may be formed by a switching element. For this switching element, a FET (Field Effect Transistor), a MOSFET (Metal Oxide Semiconductor FET) for example, may be used.

FIG. 2 illustrates a status to be obtained after the switching block 112 of the integrated circuit 124 shown in FIG. 1 is turned on. When the switching block 112 is operated to be turned on, the second capacitor 106 is connected to the integrated circuit 124 to become valid. Hence, two capacitors, the first capacitor 104 and the second capacitor 106, configure the resonance circuit, thereby changing the resonance frequency of the resonance circuit. Then, the resonance circuit can pass only the signal having the changed resonance frequency. The passed signal is passed to a detector, not shown, arranged at a later stage of the integrated circuit 124 to be rectified and smoothed.

Changing the capacitance of the integrated circuit 124 to change the resonance frequency causes a change in the impedance of the integrated circuit 124 as a whole.

Use of this impedance change allows the radio wave generating device, such as a reader/writer terminal, determine whether a response has been made by the integrated circuit 124 to the reception of radio wave. Therefore, incorporating such an integrated circuit into an information processing terminal, such as a non-contact IC card or a mobile phone that executes wireless communication with a reader/writer terminal in a noncontact manner allows the improvement of the response to the reader/writer terminal that has outputted radio waves.

It should be noted that, in the present embodiment, the capacitance of the entire capacity is changed by switching between validity and invalidity of the second capacitor 106 to connect the first capacitor 104 and the second capacitor 106 in parallel; however, the present invention is not limited to this configuration. For example, the capacitance of the entire capacitor may be changed by switching between the validity and invalidity of the second capacitor 106 to connect the first capacitor 104 and the second capacitor 106 in series.

Thus the integrate circuit associated with the first embodiment of the invention has been described with reference to FIGS. 1 and 2. The following describes an exemplary configuration of a non-contact IC card based on the integrated circuit associated with the first embodiment of the invention with reference to FIG. 3.

Referring to FIG. 3, there is shown a block diagram of an exemplary configuration of the non-contact IC card based on the above-mentioned integrated circuit.

As shown in FIG. 3, a non-contact IC card 100 is made up of an antenna coil 102, a first capacitor 104, a second capacitor 106, a switching block 112, a rectifier 114, a voltage detector 116, a demodulator 118, a digital circuit 120, a memory 122, and a confirmation block 123. A reader/writer 150 is connected to an antenna coil 152.

The non-contact IC card 100 and the reader/writer 150 transmit and receive radio waves containing a predetermined frequency component through the antenna coil 102 and the antenna coil 152. When the antenna coil 102 receives a radio wave from the antenna coil 152 of the reader/writer 150, an alternating voltage is generated across the antenna coil 102. In the present embodiment, the number of windings of the antenna coil 102 is, but not exclusively, three.

The antenna coil 102, the first capacitor 104, and the second capacitor 106 make up a frequency resonance circuit. The frequency resonance circuit is used to pass a particular frequency band (or resonance frequency) component.

The switching block 112 may be configured by a plurality of switching elements. Each switching element may be a FET, a MOSFET for example. In the present embodiment, the switching block 112 is made up of switches 112a and 112b.

Operating the switching block 112 to validate the second capacitor allows the switching of the capacitance made up of the first capacitor 104 and the second capacitor 106. The resonance frequency is determined by the inductance of the antenna coil 102 and the capacitance of the first capacitor 104 and the second capacitor 106.

The frequency of the radio wave to be transmitted from the reader/writer 150 is specified by a communications standard used. For example, with one of the communications standards for the non-contact IC card, ISO14443, the frequency of the radio wave to be transmitted from the reader/writer 150 is specified to 13.56 MHz. The inductance of the antenna coil 102 and the capacitance of the first capacitor 104 are adjusted so as to set the resonance frequency of the frequency resonance circuit also to 13.56 MHz. It should be noted that the resonance frequency of the frequency resonance circuit according to the invention is not limited to 13.56 MHz prescribed in ISO14443.

The resistor 107 is used to consume the electrical power caused by a current generated on the antenna coil 102. The non-contact IC card 100 consumes the electrical power at the resistor 107, namely, flows the current through the antenna coil 102 to generate a magnetic field therefrom, thereby making a response to the reader/writer 150 through the generated magnetic field.

The rectifier 114 is used to convert the alternating voltage generated in the antenna coil 102 into a direct voltage. The direct voltage outputted from the rectifier 114 may be used as a power voltage to drive each component in the non-contact IC card 100. The voltage detector 116 detects a voltage value of the direct voltage obtained by the rectifier 114. When a voltage value is generated in excess of a predetermined level, the voltage detector 116 stops the operation of the non-contact IC card 100.

The demodulator 118 separates the information from the radio wave transmitted from the reader/writer 150. The separated information is stored in the memory 122 via the digital circuit 120.

The confirmation block 123 makes a confirmation, when making a response to the reader/writer 150, whether a predetermined condition is satisfied or not. If a predetermined condition is found satisfied, then the confirmation block 123 causes the digital circuit 120 to output a signal for connecting the second capacitor 106 to the circuit.

Thus, an exemplary configuration of the non-contact IC card practiced as the first embodiment of the invention has been described. The following describes a wireless communications method practiced as the first embodiment of the invention.

FIG. 4A is a flowchart indicative of the wireless communications method mentioned above. As shown, in this wireless communications method, a polling signal is transmitted from the reader/writer 150 through the antenna coil 152 (step S110). If the non-contact IC card 100 is in the proximity of the reader/writer 150, the non-contact IC card 100 receives the polling signal through the antenna coil 102 (step S120).

Receiving the polling signal from the reader/writer 150, the non-contact IC card 100 causes the confirmation block 123 to check whether a predetermined period of time has passed since the reception of the polling signal (step S130). If the predetermined period of time is found not passed by the confirmation block 123, then the non-contact IC card 100 transmits, through the antenna coil 102, a response signal to the polling signal received from the reader/writer 150 (step S150).

Here, it is determined whether the reader/writer 150 is successful in the reception of the response signal from the non-contact IC card 100 (step S160). If the reader/writer 150 is found successful in the reception of the response signal, namely, if the resistor 107 of the non-contact IC card 100 is made valid to change the voltage across the antenna coil 152, the communication continues (step S170). However, if the resistor 107 is made valid but there occurs no change in the voltage across the antenna coil 152, then the reader/writer 150 determined that the reception of the response signal from the non-contact IC card 100 has failed, upon which the procedure returns to step S110 to transmit a polling signal again.

On the other hand, if the predetermined period of time is found passed since the reception of the polling signal in step S130, then the resonance frequency of the non-contact IC card 100 is changed (step S140). To be more specific, the digital circuit 120 outputs a signal to turn on the switches 112a and 112b to connect the second capacitor 106 to the circuit. Connecting the second capacitor 106 to the circuit adds the second capacitor 106 to the resonance circuit made up of the antenna coil 102 and first capacitor 104. Let the inductance of the antenna coil 102 be L, the capacitance of the first capacitor 104 be C1, and the capacitance of the second capacitor 106 be C2, then the resonance frequency changes from $1/2\pi(L \times C1)^{1/2}$ to $1/2\pi\{L \times (C1+C2)\}^{1/2}$.

FIG. 5 shows a relationship between the capacitance of the non-contact IC card and the voltage value of the reader/writer (R/W). FIG. 5A shows a relationship between the capacitance of the non-contact IC card and the voltage value of the reader/writer when the distance between the non-contact IC card 100 and the reader/writer 150 is 10 mm. In the figure, the dashed line is indicative of a case in which the resistor 107 of the non-contact IC card 100 is invalid, while the solid line is indicative of a case in which the resistor 107 of the non-contact IC card 100 is valid.

In the present embodiment, capacitance C1 of the first capacitor 104 is 125 pF. Hence, if the distance between the non-contact IC card 100 and the reader/writer 150 is 10 mm, for example, there is an obvious change in the value of a voltage generated across the antenna coil 152 of the reader/writer 150 when the resistor 107 is validated. Therefore, in the case shown in FIG. 5A, the reader/writer 150 can receive a response signal from the non-contact IC card 100 when the resistor 107 is validated.

FIG. 5B shows a relationship between the capacitance of the non-contact IC card and the voltage value of reader/writer (R/W) when the distance between the non-contact IC card 100 and the reader/writer 150 is 6 mm. Like the relationship shown in FIG. 5A, the dashed line is indicative of a case where the resistor 107 of the non-contact IC card 100 is invalid, while the solid line is indicative of a case where the resistor 107 of the non-contact IC card 100 is valid.

When the distance between the non-contact IC card 100 and the reader/writer 150 is 10 mm, there occurs little change in the value of a voltage generated across the antenna coil 152 of the reader/writer 150 when the resistor 107 is validated. Therefore, in the case of FIG. 5B, the reader/writer 150 cannot receive a response signal from the non-contact IC card 100 when the resistor 107 is validated, so that the reader/writer 150 repeatedly outputs a polling signal for the communication with the non-contact IC card 100.

The non-contact IC card 100 comes to repeatedly receive the polling signal from the reader/writer 150. Here, if the predetermined condition has been satisfied in the non-contact IC card 100, the capacitance of the non-contact IC card 100 is changed to change the resonance frequency, thereby causing the reader/writer 150 to recognize a response issued from the non-contact IC card 100. In the case of FIG. 5B, changing the capacitance of the non-contact IC card 100 from 125 pF to a higher level or a lower level obviously changes the value of a voltage generated across the antenna coil 152 of the reader/writer 150 when the resistor 107 is validated. This obvious change allows the reader/writer 150 to receive a response signal from the non-contact IC card 100 when the resistor 107 is validated.

In the present embodiment, the switches 112a and 112b are turned on to connect the second capacitor 106 to the circuit in parallel, so that the capacitance of the non-contact IC card 100 is changed higher than 125 pF; however, the present invention is not limited to this configuration. For example, a signal may be entered in the switching block to separate the capacitor from the resonance circuit and change the capacitance of the entire resonance circuit lower, thereby changing the resonance frequency.

FIG. 5C shows a relationship between the capacitance of the non-contact IC card 100 and the voltage value of the reader/writer (R/W) when the distance between the non-contact IC card 100 and the reader/writer 150 is 4 mm. FIG. 5D shows a relationship between the capacitance of the non-contact IC card 100 and the voltage value of the reader/writer (R/W) when the distance between the non-contact IC card 100 and the reader/writer 150 is 0 mm. Like the relationship shown in FIG. 5A, the dashed line is indicative of a case where the resistor 107 of the non-contact IC card 100 is invalid, while the solid line is indicative of a case where the resistor 107 of the non-contact IC card 100 is valid.

If the distance between the non-contact IC card 100 and the reader/writer 150 is 4 mm, and if the capacitance of the non-contact IC card 100 is 125 pF, an obvious change occurs in the value of a voltage generated across the antenna coil 152 of the reader/writer 150 when the resistor 107 is validated. However, if the distance is 0 mm, there occurs little change in the value of a voltage generated across the antenna coil 152.

As shown in FIG. 5D, if the distance is 0 mm, increasing the capacitances of all capacitors of the non-contact IC card 100 does not almost change the value of a voltage generated across the antenna coil 152. However, when the capacitance of the capacitor of the non-contact IC card 100 is decreased, the reader/writer 150 can recognize a response signal from the non-contact IC card 100.

As described, changing the resonance frequency of the resonance circuit depending upon when the a predetermined time has been reached as a predetermined condition allow the reader/writer terminal to recognize a response from the non-contact IC card.

It should be noted that, with the wireless communications method shown in FIG. 4A, the resonance frequency of the resonance circuit is changed depending upon whether a predetermined time has been reached; it is also practicable to change the resonance frequency depending upon whether a response signal has been transmitted the predetermined number of times as a predetermined condition.

FIG. 4B is a flowchart indicative of the wireless communications method practiced as the first embodiment of the invention. When the reader/writer 150 transmits a polling signal (step S110), the non-contact IC card 100 receives this polling signal (step S120). When the polling signal is received by the non-contact IC card 100, the response count is incremented by one (step S122). Then, the confirmation block 123 checks on the basis of the increment whether the predetermined number of times the response has been made has been reached (step S132).

If the predetermined number of times is found not reached, namely, if the response has not been made three times for example, the response signal is transmitted to the reader/writer 150 as it is(step S150). If the predetermined number of times is found reached, the resonance frequency is changed (step S140) and the response signal is transmitted to the reader/writer 150 with the changed resonance frequency (step S150). The reader/writer 150 determines whether the reception of the response signal from the non-contact IC card 100 is successful or not (step S160). If the reception is found successful, the communication is continued (step S170). If the reception is found failing, then the procedure returns to step S110 to transmit a polling signal again.

As described, changing the resonance frequency of the resonance circuit depending upon whether a response signal has been transmitted the predetermined number of times as a predetermined condition also allows the reader/writer terminal to recognize a response from the non-contact IC terminal. Obviously, the number of times a response signal has been transmitted is not limited to three times; for example, this condition may also be two or one time or four or more times for example in the present embodiment.

Thus, the wireless communications method practiced as the first embodiment of the invention has been described.

It should be noted that the above-described wireless communications method may be executed by a computer program that is stored in the non-contact IC card 100 and includes the processing of receiving a radio wave having a predetermined frequency and the processing of switching between the capacitances of all capacitors through the switching block 112.

As described above and according to the first embodiment of the invention, changing the number of capacitor to be used to change the resonance frequency can improve the communication between the reader/writer terminal, the non-contact IC card, and the information processing terminal.

(A Second Embodiment)

With reference to the above-described first embodiment, an integrated circuit has been described in which the resonance frequency of the resonance circuit may be changed by increasing the number of capacitors used. With reference to the second embodiment, the resonance frequency of the resonance circuit is changed by increasing the number of windings of coil.

Referring to FIG. 6, there is shown a circuit diagram illustrating an integrated circuit practiced as the second embodiment of the invention. As shown, an integrated circuit 224 of the second embodiment is made up of an antenna coil 202, a capacitor 204, a resistor 207, and a switching block 212.

Like the antenna coil 102 of the first embodiment, receiving a radio wave containing a predetermined frequency component from a radio wave generating device such as a reader/writer terminal, the antenna coil 202 generates an alternating voltage across the antenna coil 202 by electromagnetic induction. In the second embodiment, an intermediate terminal is arranged between both the terminals of the antenna coil 202 so as to change the inductance in multiple levels. This arrangement can change the number of windings by switching between the end terminals and the intermediate terminal. In the second embodiment, the number of windings of the 202 is, but not exclusively, five and the number of windings for the intermediate terminal is, but not exclusively, three.

Connecting the antenna coil 202 and the capacitor 204 in parallel as shown in FIG. 6 configures a resonance circuit. When a change occurs in the magnetic field passing the antenna coil 202, an alternating voltage is generated on the antenna coil 202 and a current flows into the integrated circuit 224 through the resistor 207, consuming the electric power through the resistor 207.

The switching block 212 is turned on/off to change the number of windings of the antenna coil 202. Changing the number of windings of the antenna coil 202 changes the resonance frequency of the resonance circuit made up of the antenna coil 202 and the capacitor 204.

The switching block 212 may be configured by including a plurality of switching elements. In the second embodiment, the switching element may also be a FET, a MOSFET for example. In the second embodiment, the switching block 212 includes switches 212a and 212b.

As described before, in the first embodiment, the resonance frequency of the resonance circuit is changed by changing the capacitance of the resonance circuit by operating the switching block. In the second embodiment, the inductance of the resonance circuit is changed by operating the switching block, thereby changing the resonance frequency of the resonance circuit.

Namely, the number of windings of the antenna coil is changed from three to five by operating the switching block 212 to change the inductance of the antenna coil 202, thereby changing the resonance frequency of the resonance circuit.

Incorporating the integrated circuit 224 of the second embodiment into the non-contact IC card of the first embodiment allows the reader/writer to recognize a response from the non-contact IC card by changing the resonance frequency if the reader/writer cannot otherwise recognize a response from the non-contact IC card.

It should be noted that the above-mentioned processing may be executed by a computer program that include the processing of receiving a radio wave having a predetermined frequency and the processing of switching the number of windings of the antenna coil 202 by operating the switching block 212.

As described above and according to the second embodiment of the invention, changing the inductance by changing the number of antenna coil windings to change the resonance frequency can improve the communication between the reader/writer terminal, the non-contact IC card, and the information processing terminal.

(A Third Embodiment)

In the foregoing first and second embodiments, the resonance frequency of a resonance circuit contained in a non-contact IC card or an information processing terminal is changed to improve the communication between a reader/writer terminal and the non-contact IC card or the information processing terminal. In the third embodiment, the resonance frequency of a resonance circuit contained in a reader/writer terminal is changed to improve the communication.

Figure 7:
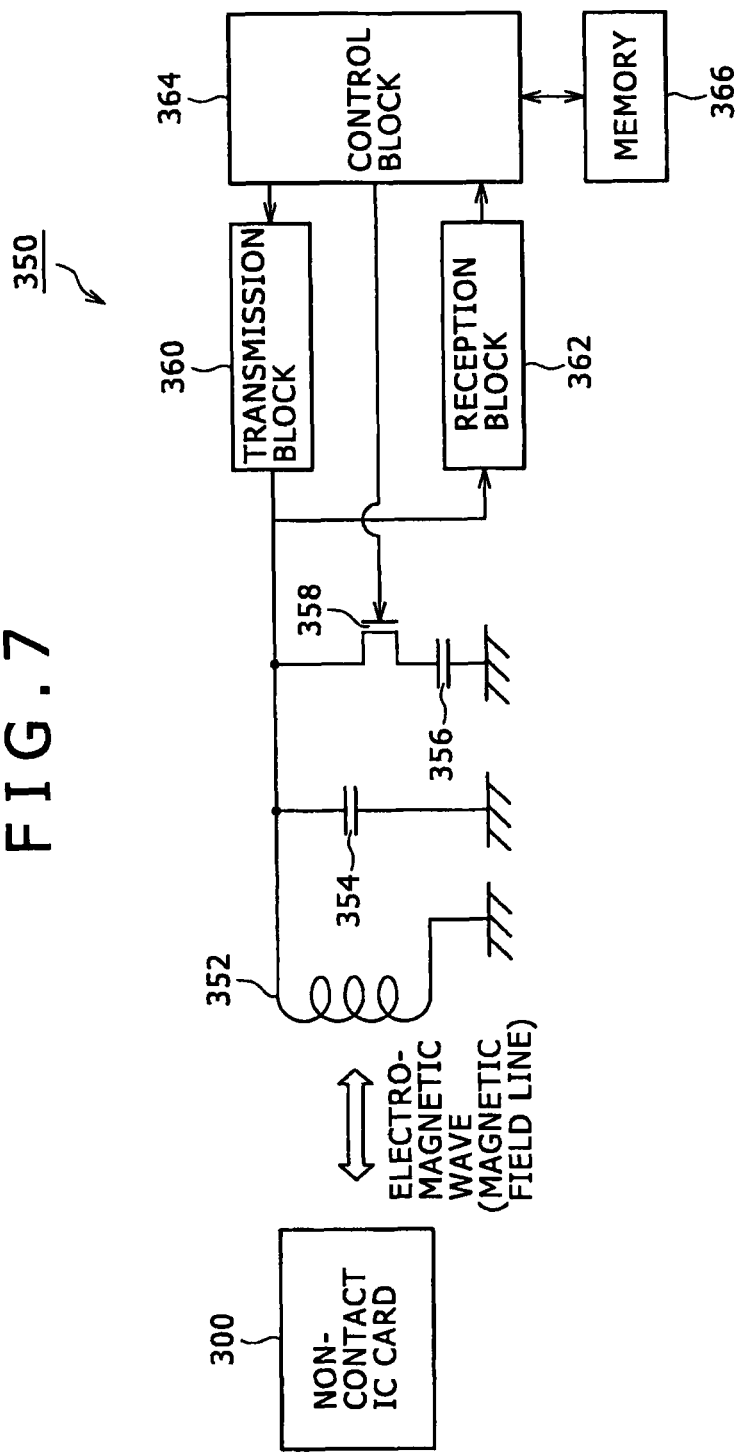
FIG. 7 is a block diagram illustrating an exemplary configuration of a reader/writer terminal practiced as a third embodiment of the invention.

Referring to FIG. 7, there is shown a block diagram illustrating an exemplary configuration of a reader/writer terminal practiced as the third embodiment of the invention. As shown in FIG. 7, a reader/writer 350 practiced as the third embodiment is made up of an antenna coil 352, a first capacitor 354, a second capacitor 356, a switching block 358, a transmission block 360, a reception block 362, and a control block 364.

The antenna coil 352 transmits a radio wave outside and receives a response signal from the non-contact IC card 300. The antenna coil 352, the first capacitor 354, and the second capacitor 356 form a frequency resonance circuit. The frequency resonance circuit passes a particular frequency band (or a resonance frequency). Normally, the antenna coil 352 and the first capacitor 354 form the frequency resonance circuit, the second capacitor 356 being separated from the circuit.

The switching block 358 is turned on/off to connect or disconnect the second capacitor 356 to and from the circuit. Connecting or disconnecting the second capacitor 356 can change the resonance frequency of the resonance circuit made up of the antenna coil 352 and the first capacitor 354.

The transmission block 360 is configured by a signal carrier generator and a modulator for modulating the signal carrier in accordance with the information to be transmitted, for example. The reception block 362 is configured by a detector for detecting the envelope of a signal received at the antenna coil 352 and a demodulator for demodulating the detected signal, for example. The control block 364 controls the reader/writer 350 in its entirety.

Thus, the configuration of the reader/writer terminal associated with the third embodiment of the invention has been described. The following describes a wireless communications method practiced as the third embodiment with reference to FIG. 8.

Figure 8:
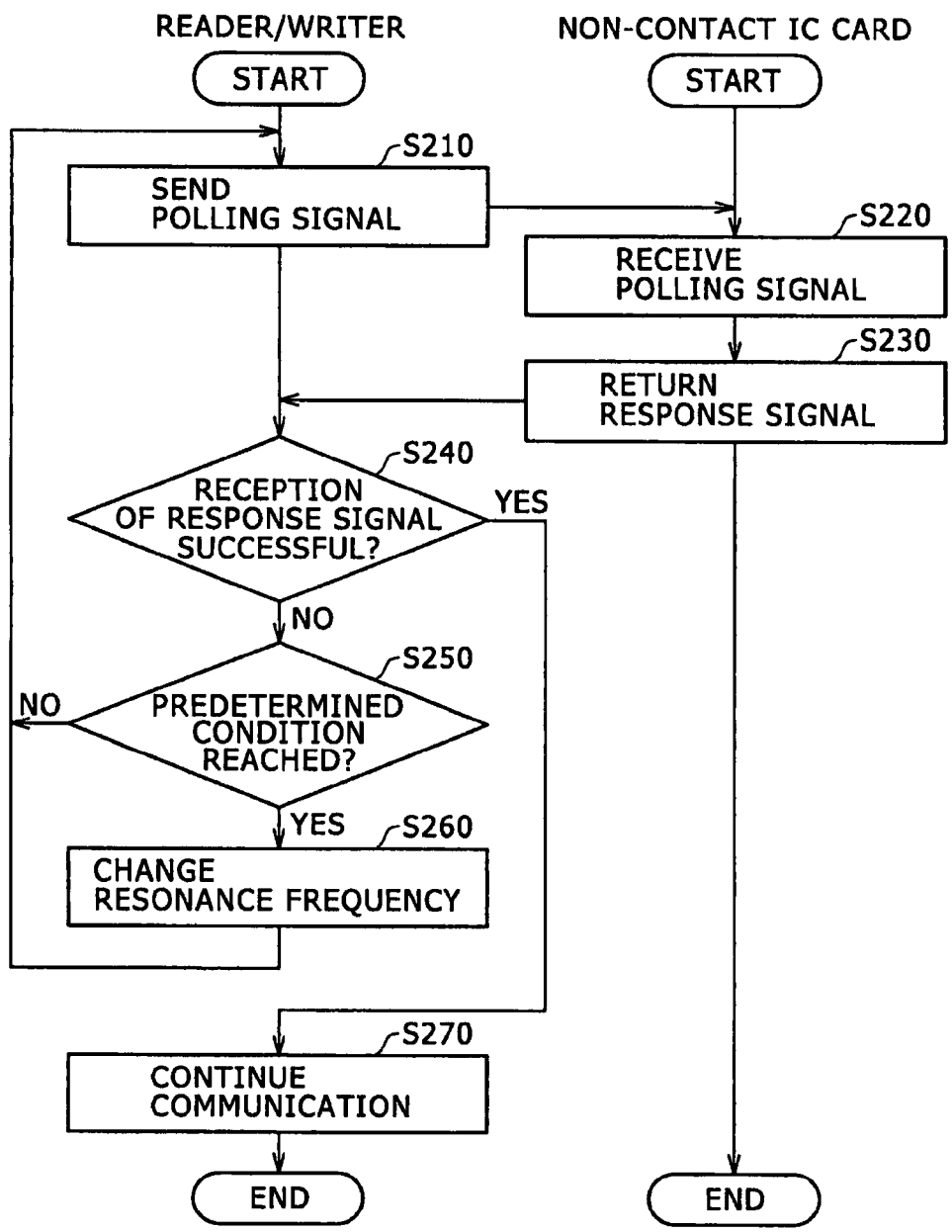
FIG. 8 is a flowchart indicative of a wireless communications method practiced as a third embodiment of the invention.
Figure 9:
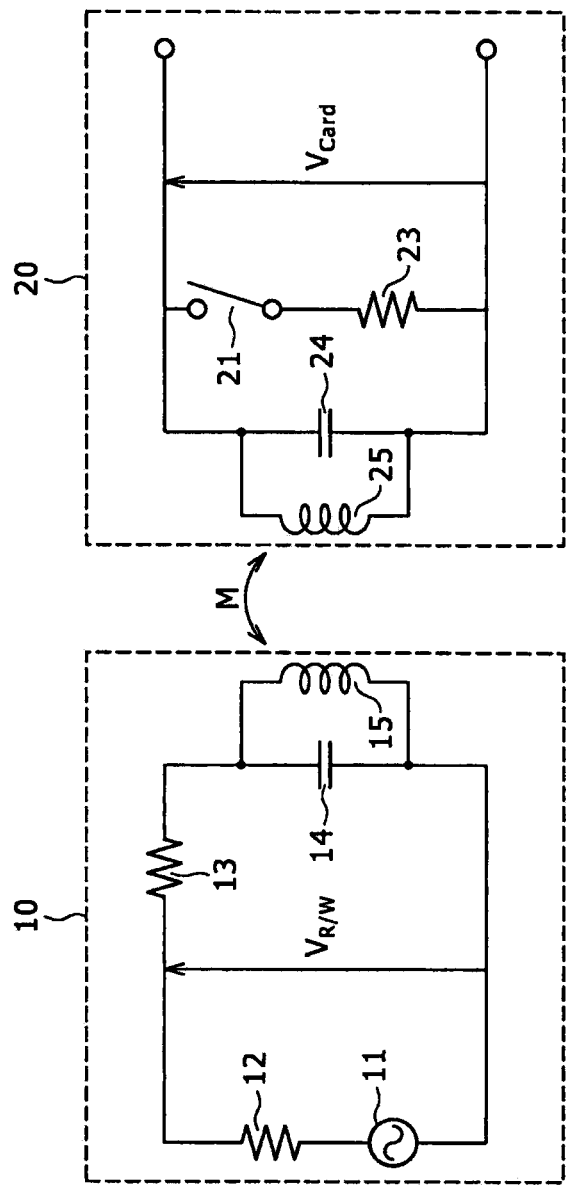
FIG. 9 is a circuit diagram illustrating a circuit of related-art reader/writer terminal and IC card.
Figure 10A:
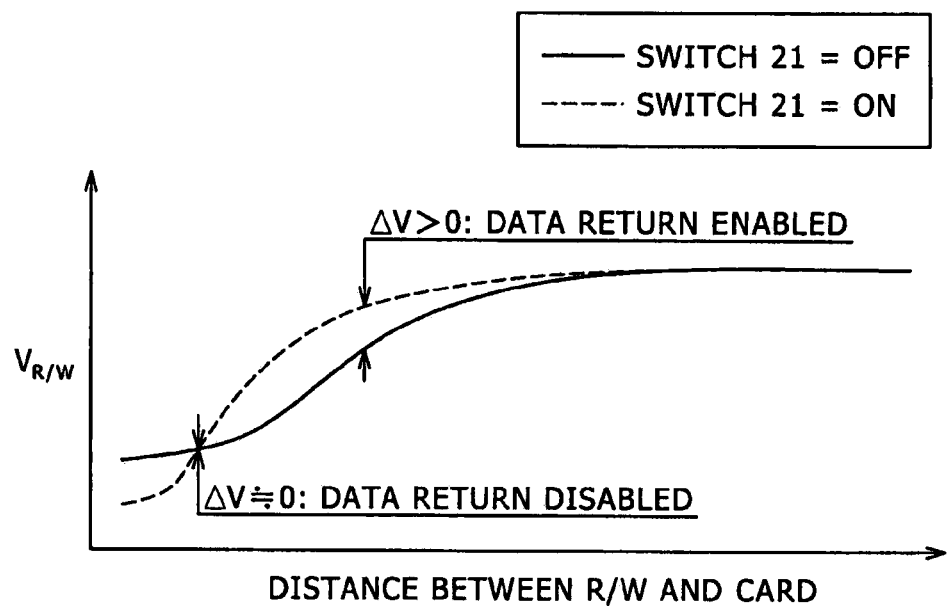
FIGS. 10A and 10B are diagrams illustrating relationships between the distance between related-art reader/writer terminal and IC card and the voltage that occurs on the reader/writer terminal.
Figure 10B:
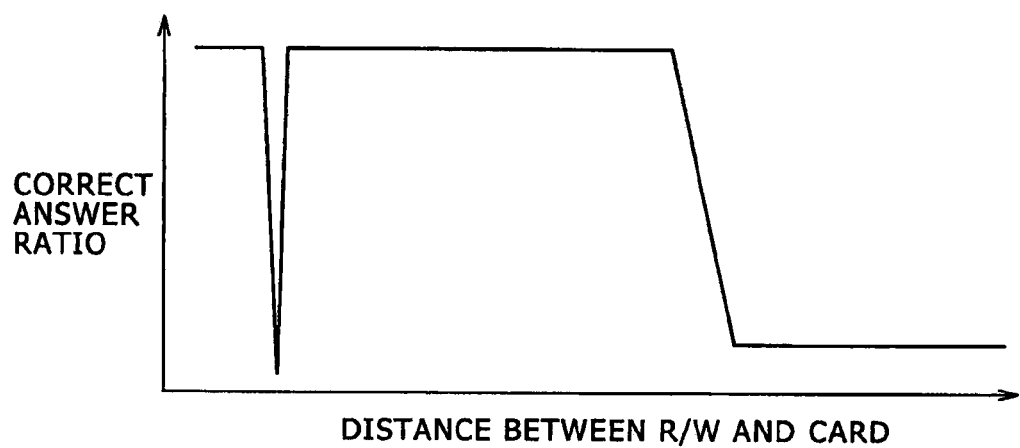

Referring to FIG. 8, there is shown a flowchart indicative of the wireless communications method associated with the third embodiment. First, the reader/writer 350 outputs a polling signal through the antenna coil 352 (step S210). If there is a non-contact IC card 300 in the proximity of the reader/writer 350, the non-contact IC card 300 receives a polling signal from the reader/writer 350 (step S220). Upon reception of the polling signal, the non-contact IC card 300 returns a response signal to the reader/writer 350 (step S230).

The reader/writer 350 determines whether the reception of the response signal from the non-contact IC card 300 is successful or not (step S240). If the reception is found failing, namely, if no change occurred in the voltage across the antenna coil 352 of the reader/writer 350, then the control block 364 of the reader/writer 350 determines whether a predetermined condition has been satisfied or not (step S250).

If the predetermined condition is found satisfied as a result of the checking by the control block 364, then the control block 364 transmits a signal for turning on the switching block 358 to validate the second capacitor 356, thereby changing the resonance frequency of the reader/writer 350 (step S260). When the resonance frequency of the reader/writer 350 has been changed, the procedure returns to step S210 to transmit a polling signal again. Then, if the communication with the non-contact IC card 300 is successful with the changed resonance frequency, the reader/writer 350 subsequently fixes the resonance frequency to that changed frequency to continue the communication with the non-contact IC card 300.

If the predetermined condition is found not satisfied in step S250, then the procedure returns to step S210 to transmit a polling signal again.

On the other hand, if the reception of a response signal from the non-contact IC card 300 is found successful in step S240, then the resonance frequency is not changed and the communication is continued as it is.

Thus, changing the resonance frequency of the resonance circuit depending upon whether a predetermined conditions has been satisfied on the side of the reader/writer also allows the reader/writer terminal to recognize a response from the non-contact IC card.

It should be noted that the above-mentioned wireless communications method according to the third embodiment may be executed by a computer program that is stored in the reader/writer 350 and includes the processing of determining whether a predetermined condition has been satisfied and the processing of validating the second capacitor 356 by operating the switching block 358 to switch between the capacitances of all capacitors, thereby changing the resonance frequency of the resonance circuit.

As described and according to the third embodiment of the invention, the number of capacitors for use in a reader/writer terminal is changed to change the resonance frequency of a resonance circuit, thereby improving the communication between the reader/writer terminal and non-contact IC card or an information processing terminal.

While preferred embodiments of the present invention have been described using specific terms, such description is for illustrative purpose only. It is obvious that changes and variations may be made by those skilled in the art without departing from the gist of claims. Therefore, the changes and variations are understood to be contained in the spirit or scope of the claims that follow.

The embodiments of the present invention are applicable to an integrated circuit, a non-contact IC card, a reader/writer, a wireless communications method, and a computer program.

What is claimed is:

1. A communication apparatus for wireless communication using a magnetic field, the apparatus comprising:
a resonance unit comprising resonance frequencies of a plurality of levels;
a confirmation unit configured to determine whether a predetermined condition is satisfied;
a switching unit configured to change at least one of the resonance frequencies if the predetermined condition is determined by the confirmation unit to be satisfied; and
an inductor configured for use in changing resonance frequencies.

2. The communication apparatus of claim 1, wherein the switching unit uses at least the inductor for changing the at least one of the resonance frequencies.

3. The communication apparatus of claim 1, wherein the inductor has inductances of a plurality of levels, and the switching unit switches between the inductances to change resonance frequencies.

4. The communication apparatus of claim 1, further comprises a capacitor configured to change the resonance frequencies.

5. The communication apparatus of claim 4, wherein the resonance unit comprises the capacitor.

6. The communication apparatus of claim 1, wherein the predetermined condition comprises one of: a predetermined count executed in the confirmation unit, or a predetermined period of time measured in the confirmation unit.

7. A method for use by an apparatus comprising a resonance unit having resonance frequencies of a plurality of levels, the method comprising:
determining whether a predetermined condition is satisfied, wherein the predetermined condition comprises one of: a predetermined count, or a predetermined period of time; and
changing at least one of the resonance frequencies using an inductor, if the predetermined condition is determined to be satisfied.

8. A device configured for wireless communication using a magnetic field, the device comprising:
a resonance unit comprising resonance frequencies of a plurality of levels;
a confirmation unit configured to determine whether a predetermined condition is satisfied;
a switching unit configured to change at least one of the resonance frequencies if the predetermined condition is determined, by the confirmation unit, to be satisfied,
wherein the switching unit changes the at least one of the resonance frequencies using a capacitor or an inductor.

9. The device of claim 8, wherein the inductor comprises inductances of a plurality of levels, and the switching unit switches between the inductances to change the at least one of the resonance frequencies.

10. A reception apparatus configured for wireless reception using a magnetic field, the apparatus comprising:
a resonance unit comprising resonance frequencies of a plurality of levels;
a confirmation unit configured to determine whether a predetermined condition is satisfied;
a switching unit configured to change at least one of the resonance frequencies if the predetermined condition is determined, by the confirmation unit, to be satisfied; and
an inductor configured for use in changing resonance frequencies.

11. The reception apparatus of claim 10, wherein the switching unit uses at least the inductor to change the at least one of the resonance frequencies.

12. The reception apparatus of claim 10, wherein the inductor comprises inductances of a plurality of levels, and the switching unit switches between the inductances to change the at least one of the resonance frequencies.

13. The reception apparatus of claim 10, further comprising a capacitor configured to change the resonance frequencies.

14. The reception apparatus of claim 13, wherein the resonance unit comprises the capacitor.

15. The reception apparatus of claim 10, wherein the predetermined condition comprises one of: a predetermined count executed in the confirmation unit, or a predetermined period of time measured in the confirmation unit.

16. An transmission apparatus configured for wireless transmission using a magnetic field, the apparatus comprising:
- a resonance unit comprising resonance frequencies of a plurality of levels;
- a confirmation unit configured to determine whether a predetermined condition is satisfied;
- a switching unit configured to change at least one of the resonance frequencies if the predetermined condition is determined, by the confirmation unit, to be satisfied; and
- an inductor configured for use in changing resonance frequencies.

17. The transmission apparatus of claim 16, wherein the switching unit uses at least the inductor for changing the at least one of the resonance frequencies.

18. The transmission apparatus of claim 16, wherein the inductor comprises inductances of a plurality of levels, and the switching unit switches between the inductances to change the at least one of the resonance frequencies.

19. The transmission apparatus of claim 16, further comprising a capacitor configured to change the resonance frequencies.

20. The transmission apparatus of claim 19, wherein the resonance unit comprises the capacitor.

21. The transmission apparatus of claim 16, wherein the predetermined condition comprises one of: a predetermined count executed in the confirmation unit, or a predetermined period of time measured in the confirmation unit.

* * * * *